Patented Mar. 21, 1933

1,902,203

UNITED STATES PATENT OFFICE

FOORD VON BICHOWSKY, OF GLENDALE, CALIFORNIA

PROCESS OF PREPARING TITANIUM DIOXIDE

No Drawing.   Application filed January 21, 1931. Serial No. 510,276.

The present invention relates especially to the treatment of titaniferous ores for the production of a pigment grade of pure titanium dioxide and has for its object to provide a process of manufacture that is both economical and easy of control.

In recent years the preparation of titanium dioxide of pigment grade has been the subject of a considerable number of patents.

The methods, that have been proposed, may be provided roughly into four classes:—

1. Treatment of a titanium ore with an acid, purification of the titanium solution so obtained and the final hydrolysis of that solution to precipitate titanium hydrate. United States Letters Patent No. 1,014,793 dated January 16, 1932, is a representative of this class.

2. Treatment of a titanium ore with gaseous chlorine and the purification and hydrolysis of the titanium chloride formed. United States Letters Patent No. 1,528,319 dated March 3, 1925 describes a process of this kind.

3. Treatment of a titanium mineral with nitrogen gas and a reducing agent at high temperature followed by purification of the so obtained titanium nitride and its conversion into a soluble titanium compound and hydrolyzing said compound. United States Letters Patent No. 1,343,441 dated June 15, 1920 belongs to this class.

4. Fusion of a titanium ore with an alkaline reagent and then bringing the alkaline titanate into solution with the final hydrolysis of the solution to precipitate $TiO_2$. United States Letters Patent No. 1,106,409 issued August 11, 1914 is illustrative of this type.

The titanium dioxide obtained by all such methods is, however, not sufficiently brilliant to make a superior white pigment. United States Letters Patent No. 1,605,851 issued November 2, 1926 describes how this lack of brilliancy in the precipitated titanium dioxide or hydrate may be overcome through roasting the precipitated dioxide with a carbonaceous material. The method of United States Letters Patent No. 1,504,673 dated August 12, 1924 covers peptizing the precipitated dioxide to a colloidal fineness and drying and roasting of the peptized titanium dioxide. While the procedure of United States Letters Patent No. 1,348,129 issued July 27, 1920 is to heat the precipitated $TiO_2$, with or without a catalyst, to about 950° C., whereby the index of refraction of the dioxide is increased.

In order to avoid the difficulties inherent in all these methods whereby the titanium in the crude ore or mineral is first brought into solution and then precipitated by hydrolysis I abandoned research along such lines and have now worked out a process that belongs to none of the four cited classes. By my simple dry process I can prepare most cheaply a titanium dioxide of excellent brilliancy or whiteness from even such an abundant material as ilmenite or other titanium ore.

The first step in my process consists in preparing an amorphous titanium sub-oxide $(Ti_3O_5)$ of commercial grade. The second step covers the purification of the sub-oxide to remove traces of impurities, while in the final step the pure amorphous titanium sub-oxide is oxidized under such conditions as to form a titanium dioxide of pigment grade.

By preparing an amorphous titanium sub-oxide as my first step I have at the start a concentrate high in titanium which is very easy to grind. In a process, such as mine, where the solid material never goes into solution it is necessary that the individual particles be very small so that the reacting gases and fluids can penetrate and thus act upon the foreign substances present in the material. For the same reason where solid reactants are used the most intimate mixing, preferably moist, should be employed. The cost of such fine grinding and mixing is, however, more than offset by the saving in chemicals, equipment and labor.

To make amorphous titanium sub-oxide in the required state or fineness and purity I first take imenite ($FeO:TiO_2$), ground to pass a 200 mesh to the inch screen and after briquetting it with crude oil, sodium aluminate or other suitable binder I heat the briquettes with a reducing agent. This agent may be a gas such as hydrogen, hydrogen sulphide, carbon monoxide, methane or mixtures of such gases in the form of coal gas, water gas, producer gas and such by-product or other gases as have a reducing action upon the material here employed. The reducing agent may also be a liquid, such as crude oil, tar, or a solid such as lamp-black or other carbon low in ash. The reducing agent reduces the iron oxide of the ilmenite to metallic iron and the titanium dioxide to the sub-oxide. I prefer to use natural gas which because of its cheapness, high methane content and freedom from ash make it especially suited as a reducing agent in my process. I usually carry out the reduction when using methane, at a temperature of 1050° C., or thereabouts. With methane the reaction proceeds slowly and in order to increase the speed of the reaction I often add a little sodium carbonate to the ilmenite. I believe that the sodium carbonate acts, as the following equations show, in two steps:

$$Na_2CO_3 + 3C \rightarrow Na_2C + 3CO$$
$$Na_2C + 3FeO \rightarrow 3Fe + Na_2CO_3$$

I have also discovered that if one heats the ilmenite in a slowly rotating retort of nickel or nickel alloy that one does not have to use such a finely ground ore as is mentioned above. The ilmenite of commerce, which will usually all pass through a 40 mesh to the inch sieve, can be placed directly in such a retort and be heated while a slow stream of methane is passed over it. The rubbing of the grains of ilmenite against each other, as the retort revolves, rubs off the reduced soft surface layer as fast as it is formed and in this way the ilmenite is slowly changed to a powder. The silica and other impurities are naturally not so diminished in size since no chemical action takes place between them and the natural gas.

The power, obtained as above, is next treated with an acid, such a hydrochloric or dilute sulphuric, to convert the iron into a soluble compound. The titanium sub-oxide which remains after the iron has been thus dissolved away by acid is washed free of soluble iron salts and excess acid and then screened or otherwise sized to remove the larger particles of silica etc. It is most essential for the success of my process that the titanium sub-oxide be very pure. If the material still contains any substantial amount of silica or alumina the sub-oxide should be mixed with sufficient soda ash or other material capable of converting the silica and alumina into alkaline silicates or aluminates. Then it should be reheated and, after the silica is all attacked, allowed to cool in a neutral or reducing atmosphere. The cold mass is then ground very fine leached with water and dried. After this treatment there still remains in the $Ti_3O_5$ a small quantity of iron in the form of an oxide. This impurity must be removed since even a trace of iron discolors the end product. One of the methods that I employ to remove this iron oxide is to mix the titanium sub-oxide with a small amount of sodium sulphate and then briquette the mixture using a suitable binder. Instead of the sodium sulphate one may use a mixture of sodium sulphate and sodium carbonate or sodium sulphide or sulphur or may heat the briquettes in an atmosphere of hydrogen sulphide. But for mechanical reasons I prefer to use the briquettes made with sodium sulphate. I next heat these briquettes in an electric, or other furnace, to about 1200° C., in a current of natural gas. The sodium sulphate is thus reduced to sodium sulphide which attacks the traces of iron oxide, present in the $Ti_3O_5$, and converts them to iron sulphides. After heating for an hour or so at the above temperature the briquettes are cooled in a neutral atmosphere. When cold they are treated, after crushing, with strong hydrochloric acid or other acid to decompose the iron sulphide. The sub-oxide of titanium so obtained is, after washing, ready for the final step of oxidization.

To improve the quality of the final product or to catalytically speed up the reaction, or both, I have found that there may be added to the moist amorphous sub-oxide a trace of phosphoric acid or a phosphate or hydrochloric acid or an ammonium salt. The moist sub-oxide with or without any or all of the above addition agents is then fed into a revolving furnace of the cement kiln type and is roasted or heated in air for about an hour or until the amorphous sub-oxide is oxidized to the desired quality of titanium dioxide. The titanium dioxide made by my process has approximately twice the covering power of white lead and is superior to white lead in tinting strength.

It is obvious that when using different combinations of reactants that different temperatures, or concentration may have to be employed to obtain the desired results but these changes are well within the scope of studies made by one skilled in the art. I do not confine myself to such variations or to the example as given but only to the claims.

What I claim as my invention is:—

1. Process of preparing titanium dioxide from crystalline titaniferous materials containing iron which comprises reducing the therein contained titanium compound by heating it with a reducing agent containing carbonaceous material to a crude amorphous sub-oxide, then leaching out the impurities and next heating the so-obtained residual sub-oxide with a sulphur containing material under non-oxidizing conditions so as to convert any iron compounds present to iron sulphides and then removing said iron sulphide impurities by means of a mineral acid and oxidizing the amorphous-titanium sub-oxide to titanium dioxide under such conditions as will give a titanium dioxide of pigment grade.

2. Process of preparing titanium dioxide from crystalline titaniferous materials containing iron which comprises heating ilmenite with a reducing agent containing carbonaceous material under reducing conditions until a crude amorphous sub-oxide of titanium is formed, removing the impurities therefrom by leaching and then heating, under non-oxidizing conditions, the so-obtained residual sub-oxide with a sulphur containing material so as to convert any iron compounds present to iron sulphides and then removing said iron sulphide material therefrom by means of a mineral acid and oxidizing the amorphous-titanium sub-oxide to titanium dioxide under such conditions as will give a titanium dioxide of pigment grade.

3. Process of preparing titanium dioxide from crystalline titaniferous materials containing iron which comprises heating ilmenite with a reducing agent containing carbonaceous material under reducing conditions until a crude amorphous sub-oxide of titanium is formed and the iron reduced to the metallic state then purifying the sub-oxide from iron and other impurities by leaching with a mineral acid and then heating the so-obtained residual sub-oxide under non-oxidizing conditions with a sulphur containing material so as to convert any iron compounds present to iron sulphides and removing said iron sulphide material therefrom by means of a mineral acid and heating the amorphous sub-oxide under such oxidizing conditions as will give a titanium dioxide of pigment grade.

4. Process of preparing titanium dioxide from crystalline titaniferous materials containing iron which comprises heating ilmenite with a hydrocarbon until the amorphous sub-oxide of titanium is formed and the iron reduced to the metallic state, dissolving said metallic iron in acid and separating the solution from the residue, and next heating the so-obtained residual sub-oxide with a sulphur containing material so as to convert any iron compounds present to iron sulphides and removing said iron sulphide material therefrom by leaching with a mineral acid and then heating the so purified amorphous sub-oxide of titanium under such oxidizing conditions as will give a pigment grade of titanium dioxide.

5. Process of preparing titanium dioxide from crystalline titaniferous materials containing iron which comprises heating ilmenite with a reducing agent consisting of sodium carbonate and crude oil tar until the amorphous sub-oxide of titanium is formed and the iron reduced to the metallic state, leaching out any soluble sodium compounds formed and treating the residue with an acid to dissolve the metallic iron and heating the residual titanium sub-oxide with a sulphur containing material in the presence of a reducing gas and removing the iron compounds of sulphur so formed with acid and roasting the residual amorphous sub-oxide of titanium under such conditions as to oxidize the sub-oxide to titanium dioxide of pigment grade.

6. Process of preparing titanium dioxide from crystalline titaniferous materials containing iron which comprises heating ilmenite together with sodium carbonate and methane until the amorphous sub-oxide of titanium is formed and the iron reduced to the metallic state and the siliceous impurities have united with the sodium carbonate then removing said sodium silicates and metallic iron and then heating the residual sub-oxide with sulphur and a hydrocarbon gas until all remaining iron is changed to iron sulphide, leaching the material with an acid and heating the so obtained amorphous titanium sub-oxide under oxidizing conditions with a small amount of an oxidization catalyst until the amorphous sub-oxide is converted into titanium dioxide of pigment grade.

7. Process of preparing titanium dioxide from crystalline titaniferous materials which comprises heating ilmenite with illuminating gas until the amorphous sub-oxide of titanium is formed and the iron reduced to the metallic state, removing the iron and impurities by leaching with dilute sulphuric acid and heating the sub-oxide so obtained with sodium carbonate in the presence of hydrogen sulphide and removing the so formed sodium silicate through leaching with water and the iron sulphide by leaching with hydrochloric acid and then heating the pure titanium sub-oxide so obtained under oxidizing conditions with a small amount of ammonium phosphate until the sub-oxide is converted into a titanium dioxide of pigment grade.

8. Process of preparing titanium dioxide from crystalline titaniferous materials which comprises heating ilmenite with a carbon containing material until the titanium oxide content of the ilmenite is reduced to the amorphous sub-oxide and the iron to metallic iron then removing the impurities by leaching with dilute hydrochloric acid and heating the residual mass with enough sodium sulphate, and in the presence of methane, to combine with traces of iron oxides present thus converting them to the sulphides of iron and then removing said iron sulphides with strong hydrochloric acid and rosating the titanium sub-oxide so purified under such oxidizing conditions as to convert the sub-oxide of titanium into titanium dioxide of pigment grade.

9. Process of preparing titanium dioxide from crystalline titaniferous materials containing iron, which comprises heating the material together with sodium carbonate in an atmosphere of methane until a decomposition is effected and an amorphous titanium sub-oxide formed and the iron reduced to a metallic state and the silica converted to a sodium silicate then removing the iron and sodium silicate from said decomposition product and heating said product with sodium sulphate in the presence of methane to convert residual traces of iron into iron sulphide, removing said iron sulphide by means of an acid and adding not over five per cent by weight of a calcium phosphate to the so purified sub-oxide and roasting in the presence of air until the titanium sub-oxide is converted into a pigment grade of titanium dioxide.

FOORD von BICHOWSKY.